Figure 6:
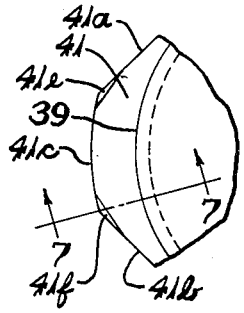

April 28, 1964 R. S. COLLEY 3,130,986
COUPLING WITH AN EDGE ENGAGING LATCH MEMBER
Filed Dec. 1, 1960 3 Sheets-Sheet 1
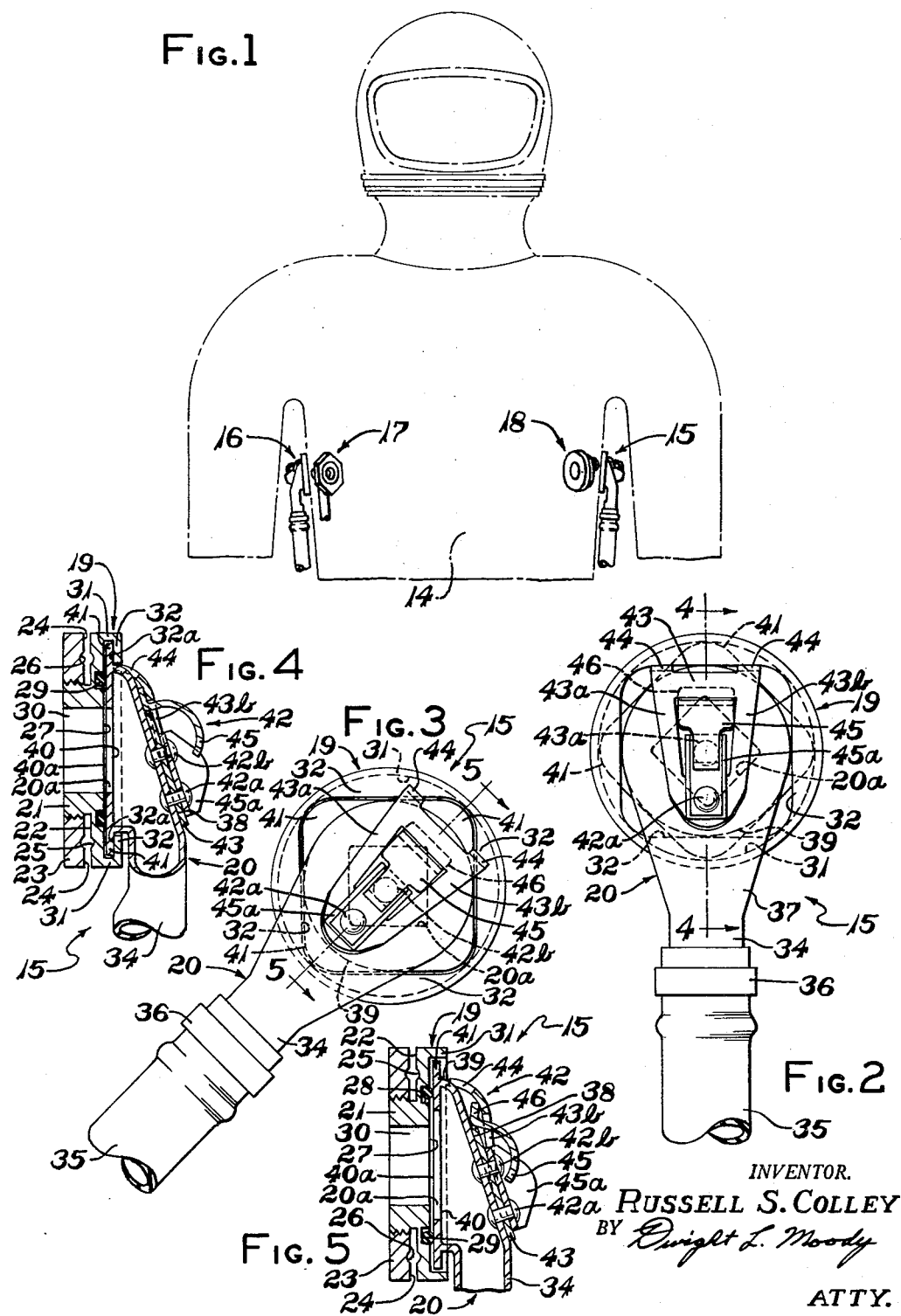
INVENTOR.
RUSSELL S. COLLEY
BY Dwight L. Moody
ATTY.

April 28, 1964   R. S. COLLEY   3,130,986
COUPLING WITH AN EDGE ENGAGING LATCH MEMBER
Filed Dec. 1, 1960   3 Sheets-Sheet 2

INVENTOR.
RUSSELL S. COLLEY
BY
ATTY.

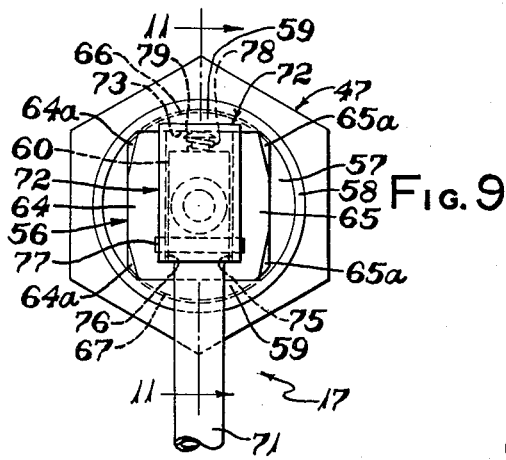
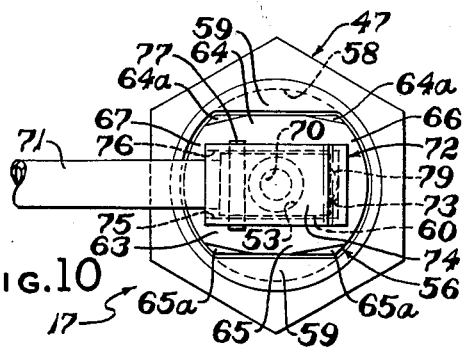
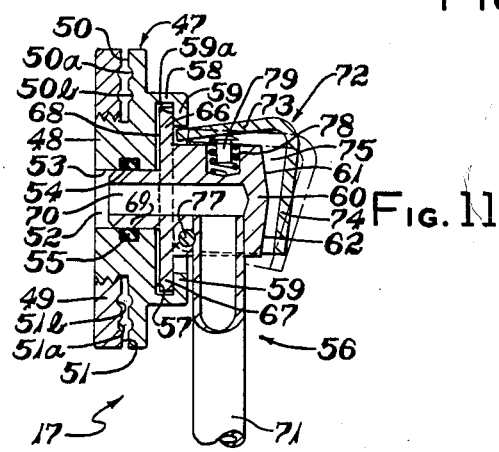
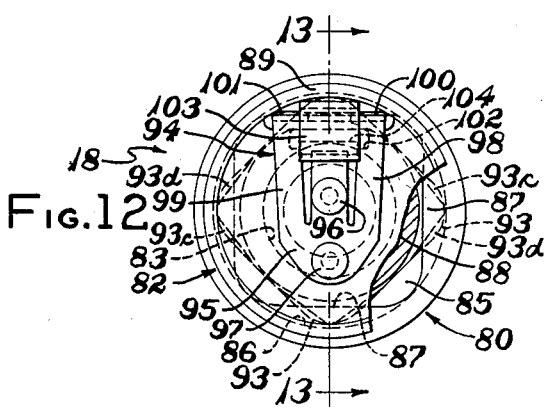
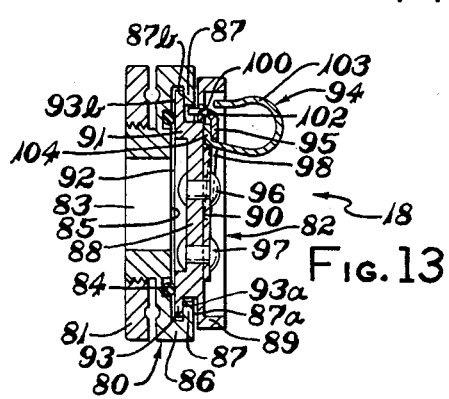

United States Patent Office 3,130,986
Patented Apr. 28, 1964

3,130,986
COUPLING WITH AN EDGE ENGAGING
LATCH MEMBER
Russell S. Colley, Cuyahoga Falls, Ohio, assignor to The
B. F. Goodrich Company, New York, N.Y., a corporation of New York
Filed Dec. 1, 1960, Ser. No. 73,071
6 Claims. (Cl. 285—82)

The invention relates to couplings and similar disconnectable joints and more particularly to such joints with a passage therein to conduct fluid such, for example, as air under pressure. The joints are especially suitable for mounting on the flexible impervious wall of an inflatable flying suit to provide for communication with the interior of the suit.

Heretofore, the inflating air under pressure has been admitted to and exhausted from inflatable flying suits of impervious flexible fabric by means of ordinary flanged end tubular fittings or connectors permanently secured adhesively to the torso-covering portion, for example, of the suit. Rubber hoses are attached directly to these fittings as by removable metal clamps generally after the flying suit is donned and ready for flight in an aircraft at high altitude. The ordinary tubular fitting is objectionable because it and the associated hose interfere with the wearer's movements, and because the hose has to be connected to and disconnected from the fitting each time the suit is used.

Other known fittings of the two-piece type are objectionable either because they require two hands to attach and to release the pieces or because they permit accidental disengagement of one piece from the other piece of the fitting.

Ordinary tubular fittings generally of one piece, end flanged construction for connecting the suit to a pressure gauge on the airplane instrument panel which gauge measures the inflating pressure within the flying suit, and for conducting fluid under pressure to pockets on an anti-G garment within the flying suit, have also been suitably permanently secured to the wall of the flying suit. When the anti-G garment is not worn, it is necessary to provide means to plug the fitting so that the flying suit can be inflated.

This invention provides an improved disconnectable joint or connector adapted to conduct fluid, which joint eliminates the foregoing and other difficulties and disadvantages of the said prior fittings and has provision of means for interlocking its pair of cooperating members in sealed relationship by virtue of juxtaposition and relative rotation of the members, retractable latch means being carried by one of the members and cooperating with the other member to prevent relative rotation of the interlocked members until the latch means is retracted.

Objects of the invention are to provide for conveniently connecting and disconnecting said pair of cooperating members of the joint as by operation with one hand only; to provide for fluid-tightness of the joint; to provide for continuity of a fluid passage through the members of the joint; to provide for temporarily closing the fluid passage in one of said members; to provide for a positive release of one member relative to the other by virtue of the resilient pressure of retractable latch means against a camming surface of one member upon relative rotation of the members; to provide for automatically interlocking the members in sealed relation after one member has been juxtaposed and rotated a predetermined number of degrees relative to the other member; to provide for simplicity of construction, convenience of manufacture and installation, and for effectiveness of operation.

Further objects are to provide for mounting the joint on the flexible wall of an inflatable flying suit in detachable sealed relationship thereto; to provide for conveniently interlocking the cooperating members of the joint subsequent to donning the inflatable flying suit; to provide for sealing the interlocked members of the joint; and to provide for conveniently engaging and disengaging the members by one hand operation only and for preventing accidental disengagement of the members of the mounted joint.

These and other objects and advantages of the invention will be apparent from the following description.

Figure 7:
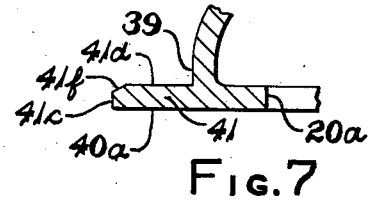
Figure 8:
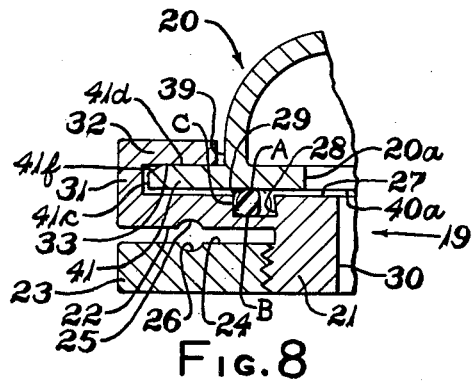
Figure 15:
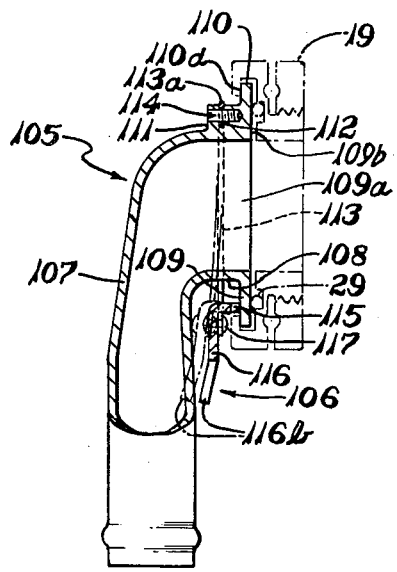
Figure 14:
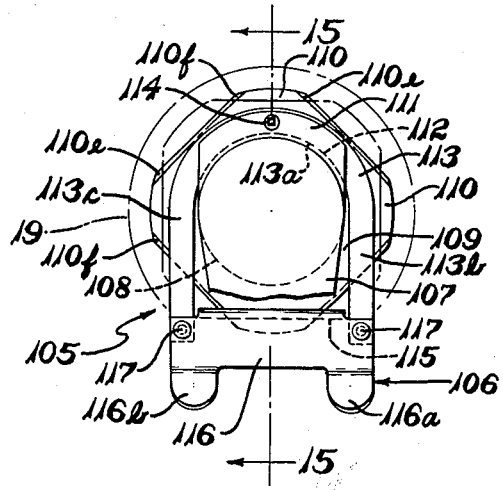

In the accompanying drawings which constitute a part of this specification and in which like numerals are employed throughout to designate like parts, FIG. 1 is an elevational view looking toward the front of an inflatable flying suit showing mounted thereon a plurality of disconnectable joints constructed in accordance with and embodying the invention, the suit being shown in broken lines and parts being broken away, FIG. 2 is a plan view of a disconnectable joint for admitting inflating air into the suit or for exhausting the inflating air from the suit, the joint being shown unmounted and in the interlocked position, a part being broken away and in section, FIG. 3 is a view of the unmounted disconnectable joint shown in FIG. 2 but showing the joint in the unlocked position, a part being broken away and in section, FIG. 4 is a sectional view taken along line 4—4 of FIG. 2, parts being broken away, FIG. 5 is a sectional view taken along line 5—5 of FIG. 3, parts being broken away, FIG. 6 is a fragmentary view on an enlarged scale of a flange portion of a nozzle member of the joint, part being in section, FIG. 7 is a sectional view taken along line 7—7 of FIG. 6 showing an inclined camming surface of the flange portion, FIG. 8 is a sectional view on an enlarged scale showing mating parts of the joint members in fluid-tight interlocked relation, parts being broken away, FIG. 9 is a plan view of a modified construction of the disconnectable joint shown in FIG. 2, the joint being shown unmounted and in the interlocked position, a part being broken away and in section, FIG. 10 is a view like FIG. 9 but showing the modified joint in the unlocked position, a part being broken away and in section, FIG. 11 is a sectional view taken along line 11—11 of FIG. 9, broken lines indicating latch means in the retracted position, parts being broken away, FIG. 12 is a plan view showing a further modification of the disconnectable joint shown in FIG. 2, the joint being shown unmounted and in the interlocked position, parts being broken away and in section, FIG. 13 is a sectional view taken along line 13—13 of FIG. 12, FIG. 14 is a top view of a modified construction of the nozzle member shown in FIGS. 2 to 8, inclusive, parts being broken away, and FIG. 15 is a sectional view taken along line 15—15 of FIG. 14, parts being broken away.

Each of the particular disconnectable joints or couplings 15, 16, 17, 18 shown in the drawings comprises a pair of cooperating coupling members, one of which, a socket member, has an annular recess with an annular sealing element of elastomeric material therein, the other of said members, a socket-engaging member, having a sealing surface engageable with the sealing element. The members have interlocking surfaces engageable upon juxtaposition and relative rotation of the members. Retractable latch means desirably including a resilient portion is carried by one of the members and cooperates with the other member to prevent relative rotation of the interlocked members until the latch means is retracted, said resilient portion yieldably resisting such retraction. The member having the sealing element preferably includes a passage for conducting fluid extending through such member axially of the sealing element. The disconnectable joints are designed for use with an inflatable flying suit, although not necessarily limited thereto, since they may be used for other purposes such, for example, as providing for a quick connection and disconnection of adjacent ends of tubing and the like.

For inflatable flying suit purposes, the disconnectable joints 15 and 16, each having the construction shown in FIGS. 2 to 8, inclusive, are capable of removable sealed attachment to the flexible impervious wall of the torso-covering portion 14 of the suit. The joints may be disposed at the opposite sides of said portion 14 as shown in FIG. 1, one 15 for admitting air under pressure to the interior of the suit to inflatably distend the latter and the other 16 for exhausting the inflating air from within the suit to the surrounding atomsphere.

The invention also provides a modified construction 17 of the disconnectable joint as shown in FIGS. 9, 10, and 11, capable of attachment to the torso-covering portion 14 adjacent and to the rear of the disconnectable joint 16. The modified construction 17 is adapted for connection to a rubber hose (not shown) which is connected to a suitable pressure gage (not shown) on the aircraft instrument panel for registering the inflating pressure within the suit. The invention further provides a second modification 18 of the disconnectable joint shown in FIGS. 12 and 13, and adapted for attachment to the torso-covering portion 14 adjacent and to the rear of the disconnectable joint 15. This second modified construction 18 has its passage for conducting fluid closed, whereby the suit can be inflated when an anti-G garment (not shown) with inflatable pockets is not worn within the suit.

The disconnectable joints 15 and 16 being similar in construction, only the joint 15 will be described in detail. The disconnectable joint 15 comprises a pair of cooperating coupling members 19, 20 each of which may be made of aluminum alloy, stainless steel, or other suitable metal material or made of a suitable rigid thermosetting plastic material. The members 19 and 20 are preferably made of aluminum alloy for use with flying suits.

The socket member 19 may have a circular configuration and includes an integral tubular attaching portion 21 of reduced diameter extending perpendicular to and away from a planar face 22 of the member 19. The member 19 is positioned with its transversely arranged face 22 against the outer side of the flexible impervious wall of the suit with the attaching portion 21 extending through an aperture in the suit wall, when the joint 15 is attached to the suit. The attaching portion 21 is externally threaded for adjustable threaded engagement with means 23 which may be a flat inner annular element or ring of suitably aluminum alloy with desirably the same outside diameter as that of the member 19.

The inner ring 23 has internal screw threads engaging the threads of the attaching portion 21 and has a planar face 24 opposite and substantially parallel to the planar face 22 of the member 19, when the inner ring 23 is mounted on the attaching portion. Each of the planar faces 22, 24 has a corresponding annular shallow relief 25 and 26, respectively, to accommodate deformable sealing material with which the respective faces 22 and 24 are desirably thinly coated before the member 19 is attached in sealed relationship to the suit wall by threading the inner ring 23 onto the attaching portion 21 until the suit wall is securely clamped between the member 19 and the inner ring 23.

The socket member 19 includes a planar internal seating surface 27 disposed, like the face 22, transversely of the axis of the attaching portion 21 and having an annular recess 28 with an annular sealing element 29 of elastomeric material therein. The sealing element 29 is an O-ring of resilient silicone rubber composition and of a cross-sectional diameter sufficient to permit the O-ring sealing element to occupy initially the major part of the space in the undercut recess 28 and to project initially slightly outward beyond the plane of the seating surface 27. This makes feasible initial resilient deformation of the O-ring sealing element, as shown in broken lines in FIG. 8, providing two opposed, substantial flattened areas thereof in sealing contact with the bottom wall of the recess 28 and the other member 20, while at the same time providing resilient outward pressure against the member 20 and also frictional resistance to rotation of the member 20, when the joint 15 is under no internal fluid pressure and is in the interlocked closed condition shown in FIGS. 2, 4 and 8. However, under an internal fluid pressure condition, such pressure acting on the radially inner surface of the O-ring increases the initial resilient deformation, as shown in full lines in FIG. 8, such that the O-ring has three substantial flattened areas A, B, C in sealing contact with the bottom and outer side wall of the recess 28 and and the other member 20, thus effectively sealing the joint.

The member 19 has a passage 30 desirably of uniform diameter for conducting fluid, the passage extending centrally through the member including the attaching portion 21 to the internal seating surface 27. That is, the passage 30 extends entirely through the member 19 axially of the annular sealing element 29. The construction makes possible conducting the inflating air through the member 19 to or from the interior of the flying suit.

The member 19 includes a continuous annular sidewall 31 extending away from the outer periphery of the seating surface 27 and terminating in a plurality of overhanging segmental projections or portions 32 extending radially inward from the sidewall 31 substantially parallel to the surface 27. These projections 32 define a generally polygonal opening. Preferably, there are four overhanging segmental portions defining an opening of generally quadrangular configuration with rounded corners in the member 19. This construction and arrangement provides a channel of uniform depth in the member 19 defined by the transverse planar seating surface 27, the continuous annular sidewall 31 and the overhanging segmental portions 32. The internal seating surface 27 and the planar inner surfaces 32a of the segmental portions 32 constitute surfaces interlocking with adjacent planar surfaces 40a, 41d of the other member 20 upon juxtaposition and relative rotation of the members 19 and 20. The planar outer surfaces 33 of the segmental portions 32 constitute first camming surfaces 33 which coact with retractable latch means 42 in a manner to be described hereinafter.

The socket-engaging member 20 of disconnectable joint 15 constitutes a hollow integral nozzle which is positioned externally of the suit and is juxtaposed and rotated relative to the member 19 into interlocked relation therewith by operation from the exterior of the suit, whereby the nozzle 20 has desirably its substantially square mouth opening 20a in alignment and communication with the round passage 30 to permit conducting fluid entirely through the joint 15. The hollow integral nozzle 20 is formed with a tubular end portion 34 of substantially uniform diameter having at its free end an external annular bead for facilitating a secure sealed attachment of a flexible rubber hose 35 to the nozzle 20 as by means of a suitable removable metal clamping band 36. The nozzle 20 has an intermediate portion 37 flaring away from the tubular portion 34 and having desirably a substantially flat upper wall portion 38 inclined relative to the plane of the longitudinal axis of the tubular portion 34 and in the direction toward the mouth opening 20a, as shown in FIGS. 4 and 5. The flared intermediate portion 37 including its flat upper wall portion 38 merges with a mouth end portion comprising an annular or circular upright wall portion 39 arranged substantially perpendicular to said longitudinal axis of the tubular end portion 34 and united with a planar end wall portion 40 arranged substantially parallel to and below the said longitudinal axis in spaced relation to the tubular end portion 34 and to the adjacent overlying wall of the intermediate portion 37.

The end wall portion 40, except for the mouth opening 20a extending centrally therethrough, is continuous and has a planar lower or outer surface 40a constituting a continuous sealing surface for contacting and elastically deforming the O-ring sealing element 29 and for positioning in closely spaced parallel relation to the planar internal seating surface 27 of the member 19, when the members 19 and 20 are interlocked. The end wall portion 40 includes a plurality of planar, circumferentially spaced, interconnected lobe-like flange portions 41 desirably of generally triangular configuration in plan extending radially outward from the circular wall portion 39, each flange portion 41 having converging straight side edges 41a, 41b intersecting a rounded radially outer edge 41c, whereby the end wall portion 40 has an outer peripheral configuration corresponding to that of the polygonal opening defined by the segmental projections or portions 32 of the member 19. Preferably, there are four planar flange portions 41 each of a uniform thickness slightly less than the uniform spacing between the seating surface 27 and the overhanging segmental projections 32 and adapted to be inserted first through the said member 19 opening and subsequently received in a channel bounded by the said seating surface, annular sidewall and overhanging segmental projections of the member 19. The flange portions 41 have a slight clearance relative to the annular sidewall 31 so as to center the nozzle 20 relative to the member 19 during relative rotation of the member and nozzle.

The planar upper surface 41d of each flange portion has marginal flat camming surfaces 41e, 41f inclined toward the planar lower surface 40a and extending along at least the major part of the straight side edges 41a, 41b to the rounded outer edge 41c, as shown in FIGS. 6 and 7. The construction not only eliminates either straight side edge 41a or 41b abutting against the radially inner edge of a segmental projection in a manner preventing initial relative rotation of the nozzle 20, but compels the said edge of a segmental projection to contact and slide across one of the camming surfaces 41e, 41f onto the planar upper surface 41d during the initial relative rotation of the nozzle and entry of the flange portions 41 into the channel. This positively moves the sealing surface 40a toward the seating surface 27 so as to contact and elastically deform the O-ring sealing element 29 to its shape shown in broken lines in FIG. 8. During subsequent relative rotation of the nozzle, and increased entry of the flange portions 41 into the channel, the planar upper surface 41d of each flange portion is resiliently held in contact with the planar inner surface of a segmental projection by virtue of the elastic deformation of the O-ring, as shown especially in FIG. 8, while the planar lower surface 40a is slightly spaced from the seating surface 27, but in sealing contact with a substantial flattened area "A" of the O-ring sealing element 29. Thus, looseness and relative tilting movement of the interlocked member 19 and nozzle 20 are avoided.

When the member or hollow nozzle 20 is juxtaposed and rotated relative to the member 19 until the members are in the locked relationship shown in FIGS. 2 and 4, the four flange portions 41 have their flat surfaces 40a, 41d interlocked with the seating surface 27 and the inner surfaces 32a of the four segmental projections 32, and also are pressed resiliently outward in contact with the inner surfaces of the segmental projections by virtue of the elastic deformation of the O-ring sealing element. It will be noted that the circular wall portion 39 of the nozzle has an outside diameter slightly less than the dimension between the straight, parallel, radially inner edges of opposite segmental projections 32 for clearance purposes as well as to permit 360° rotation of the hollow nozzle 20, if desired, and to permit temporarily retaining the member or hollow nozzle 20 at any one of four circumferentially spaced-apart positions.

For maintaining the interlocked relationship by preventing relative rotation of the member 19 and hollow nozzle 20, the preferred construction includes retractable latch means 42 carried by the hollow nozzle. The latch means 42 includes a resilient portion or spring lock 43 of suitable flat sheet metal such, for example, as stainless steel secured at its central upper end region as by spaced rivets 42a, 42b to the downwardly inclined, flat upper wall portion 38 and terminating in dependent locking portions or tab means consisting of a pair of transversely spaced, dependent, integral, substantially flat tab locking portions 44 each adapted to have a side thereof contact the straight radially inner edge of a segmental projection 32. These spaced locking portions 44 are in end-to-end alignment and normally extend downwardly in adjacent spaced relation to the circular wall portion 41, when the resilient portion 43 is not retracted. The resilient portion or spring lock 43 is cut away in a manner to provide transversely spaced side arm portions 43a, 43b both of which are connected to the tab portions 44 and are free to flex relative to the riveted upper part of the lock. Thus, the spring lock 43 yieldably resists retraction or lifting, and when in its normal non-retracted locking position shown in FIGS. 2 and 4, has its dependent tab portions 44 capable of engaging the straight inner edge of a segmental projection 32 of the member 19 to prevent relative rotation of the interlocked member 19 and hollow nozzle 20. The tabs or locking portions 44 prevent relative rotation of the coupling members when they are engaged with the inner edge of projection 32 because the locking portions are disposed so that certain regions thereof have a greater rotational radius about the axial center of the coupling members than the minimum distance of said engaged edge area to said axial center.

When the spring lock 43 is retracted by virtue of flexure of its side arm portions 43a, 43b, and the hollow nozzle then rotated several degrees relative to the member 19, the tab portions 44 are resiliently urged toward and ride on the outer camming surfaces 33 of adjacent segmental projections 32 until the flange portions 41 are positioned to correspond with the opening defined by the segmental projections 32, as shown in FIG. 3. The moment this position is reached the spring lock positively urges the nozzle 20 in the direction away from the seating surface 27 out of contact with the sealing element 29 of the member 19, thereby breaking the seal of the joint. The elastomeric O-ring sealing element 29, when elastically deformed, not only resiliently holds the flange portions against the segmental projections but coacts with the spring lock 43 by frictionally resisting relative rotation of the interlocked member 19 and the nozzle 20, and due to its tendency to elastically resume the normal O-ring shape, further coacts with the spring lock 43 to urge the nozzle away from the member and thus facilitate quick disconnection of the joint members 19, 20.

The retractable latch means 42 includes actuating means 45 engaging the spring lock 43 for flexing the same to its retracted position shown in FIG. 5. In the preferred construction, the actuating means is a lifting arm 45 of suitable metal such, for example, as stainless steel, which arm has an arcuate portion extending through a transverse slotted opening in the lock 43 and terminating at one end in a short, radially outward projecting, planar lever portion 46. The lever portion 46 is disposed between the flat upper wall portion 38 of the nozzle 20 and the spring lock 43 with the arcuate portion of the lifting arm 45 extending upwardly and rearwardly toward the tubular end portion 34 in the manner shown in the drawings.

When the spring lock is in its normal non-retracted position shown in FIG. 4, the lever portion 46 is yieldably held in full contact with the flat upper wall portion 38 of the nozzle, but pivots about its junction with the arcuate portion of the lifting arm 45, when force is exerted against the arcuate portion rearwardly and toward the flat upper wall portion of the nozzle. As a result of the pivoting shown in FIG. 5, the spring lock 43 including its side arm portions 43a, 43b is compelled to flex upwardly to its retracted position. When such force is terminated, the spring lock resiliently resumes its normal non-retracted position, unless one or both tab portions 44 contact a camming surface 33 of a segmental projection 32.

Means 45a is provided for guarding the lifting arm 45 to prevent its accidental operation and to prevent its catching on adjacent parts of the suit. The means 45a may be a generally U-shaped in cross-section element of stainless steel, for example, superimposed on the spring lock and held in place by the rivets 42a, 42b. The legs of the U-shaped guard element may be generally triangular shape and extend upwardly adjacent the side edges of a reduced width free end portion of the lifting arm 45 to thereby shield the same.

In the operation of the disconnectable joint 15, assuming the one member 19 is attached to the flexible impervious wall of the suit and assuming the rubber hose 35 is connected to the hollow nozzle 20, the wearer of the suit grasps the nozzle 20 in one hand and juxtaposes the nozzle, mouth end first, in the polygonal opening in the member 19, as shown in FIG. 3. Then the wearer presses the nozzle end wall portion 40 including its flange portions 41 firmly toward the seating surface 27 and against the sealing element 29 with the tab portions 44 contacting adjacent camming surfaces 33, thereby automatically retracting the spring lock 43. At the same time, he rotates the nozzle 20, clockwise or counterclockwise, sufficiently to position the four flange portions in the channel in interlocking relation with the four overhanging segmental projections 32, as shown in FIG. 2. After the nozzle has been rotated, for example 45°, to the position shown in FIG. 2, the O-ring sealing element seals against the sealing surface 40a and resiliently holds the flange portions in contact with the segmental projections, while the spring lock resiliently resumes its non-retracted position and both tab portions 44 enter the clearance space between the straight inner edge of a segmental projection 32 and the circular wall portion 39 of the nozzle, whereupon the member 19 and nozzle 20 are interlocked in sealed relationship and retained against relative rotation by the functioning of the spring lock and the elastically deformed O-ring sealing element.

To quickly disconnect the nozzle 20 from the member 19. The wearer of the suit simply presses a finger against the lifting arm 45 in the rearward direction toward the nozzle to thereby flex and retract the spring lock 43. Next he rotates the nozzle with the tab portions 44 resiliently pressing against the outer camming surface or surfaces of one or two segmental projections 32 until the four flange portions 41 of the nozzle end wall portion 40 reach a position where they are entirely clear of the segmental projections 32 as shown in FIG. 3. Then the O-ring sealing element resumes its normal non-deformed shape and the spring lock resumes its non-retracted condition thereby positively and resiliently urging the nozzle 20 away from the member 19 thus breaking the seal. The wearer can now readily disconnect the nozzle 20 from the member 19.

The modified disconnectable joint 17 of the sealing type includes a pair of cooperating members 47, 56 having interlocking surfaces and retractable latch means carried by one of the members, and is suitable for connection as by a rubber hose (not shown) to a pressure gauge (not shown) adapted to measure the inflating pressure within the flying suit. One of said members 47 may be made of suitable stainless steel and has a hexagonal external configuration to accommodate engaging a wrench for tightening purposes. The member 47 has an externally threaded, integral, tubular attaching portion 48 for extending through an aperture in the suit wall and for adjustable threaded engagement with the internal threads of an inner nut 49 with a hexagonal periphery corresponding to that of the member 47. When the inner nut 49 is threaded on the attaching portion 48, the member 47 and the nut 49 have opposed, adjacent planar faces 50 and 51, respectively, in substantially parallel relationship, each of which faces has desirably a pair of concentrically arranged shallow annular reliefs 50a, 50b, 51a, 51b to receive therein deformable sealing material utilized to seal the faces 50, 51 against the outer and inner sides of the suit wall.

The hexagonally shaped member 47 including its attaching portion 48 has preferably a central passage 52 of uniform diameter extending entirely therethrough. The wall 53 of the passage 52 has an undercut annular recess 54 with a sealing element 55 of suitable elastomeric material therein. Thus, the one member 47 has its central passage 52 extending through the member axially of the annular sealing element 55.

The sealing element is desirably an O-ring of resilient silicone rubber composition and of a cross-sectional diameter sufficient to occupy initially the major part of the space in the undercut recess 54 and to have initially at least part of the O-ring sealing element project slightly radially inward beyond the wall 53. This makes feasible elastically deforming the O-ring sealing element in a manner to provide two substantial flattened areas in sealing contact with the radially outer or bottom wall of the recess 54 and the other hollow member 56, and also provide frictional resistance by the elastically deformed O-ring sealing element to rotation of said other member 56, when the joint 17 is under no internal fluid pressure and in the interlocked closed condition shown in FIGS. 9 and 11. Under internal fluid pressure in the joint 17, the elastically deformed O-ring sealing element has three substantial flattened areas in contact with the said bottom wall and an axial sidewall of the recess 54 and with the other hollow member 56.

The member 47 includes a planar seating surface 57 disposed transversely at the inner end of the passage 52 and an annular sidewall 58 extending away from the seating surface 57 and terminating in a plurality of overhanging segmental projections or portions 59 extending radially inward from the sidewall 58. Preferably, there are two planar overhanging segmental projections 59 defining an opening of generally polygonal configuration in the member 47, the pair of segmental projections being diametrically opposite one another with their inner edges straight and parallel as shown in FIGS. 9 and 10. This arrangement provides a channel in the member 47 bounded by the planar seating surface 57, the annular sidewall 58 and the overhanging segmental projections 59. The seating surface 57 and the planar inner surfaces 59a of the segmental projections 59 constitute surfaces for interlocking with adjacent surfaces of the hollow other member 56 upon juxtaposition and relative rotation of the members 47 and 56.

The hollow other member 56 which is juxtaposed and interlocked with the member 47 by operation from the exterior of the suit, is adapted for connection to a rubber hose (not shown) leading the pressure gauge. The member 56 includes a stainless steel body 60 of substantially rectangular (greater length than width) cross-sectional shape having oppositely inclined, longitudinally extending, planar upper surfaces 61 and 62 intersecting one another along a laterally extending line centrally of the body 60. The body 60 has an integral, continuous, radially outward extending, planar bottom flange 63 spaced from the inclined surface portions 61, 62 providing straight edged flange portions 64, 65 with planar upper surfaces extending longitudinally along the sides of the body and arcuately edged flange portions 66, 67 with planar upper surfaces extending across the ends of the body. The body 60 including its integral bottom flange 63 has a planar lower surface 68 for positioning in closely spaced relation to the seating surface 57 of the member 47 as shown in FIG. 11.

The integral flange portions 64 to 67, inclusive, have a peripheral configuration corresponding to that of the opening defined by the annular sidewall 58 including its diametrically opposed segmental projections 59. The flange portions 64 to 67 are of sufficient uniform thickness to enter and fit with a slight clearance in the channel bounded by the seating surface 57, sidewall 58 and segmental projections 59, the planar upper surfaces of the flange portions 64 to 67 being in sliding contact with the planar inner surfaces of the segmental projections 59. The side flange portions 64, 65 have their planar upper surfaces provided with marginal camming surfaces 64a, 65a inclined relative to the lower surface 68 and extending along their edges to the arcuate edges of the end flange portions 66, 67 to facilitate the latter portions entry into the channel. When the hollow member 56 is juxtaposed as shown in FIG. 10 and rotated 90° relative to the member 47 until the members are in the relationship shown in FIGS. 9 and 11, the rounded edge flange portions 66 and 67 contact and are interlocked with the segmental projections 59.

The body 60 includes an integral tubular centering portion 69 of uniform outside diameter projecting centrally away from the transverse planar lower surface 68 for disposition in sliding fit relationship to the wall 53 of the passage 52 to thereby elastically deform and partially radially flatten the O-ring sealing element 55. The tubular centering portion 69 may be chamfered at its free end to facilitate its insertion into the passage 52, and has sufficient axial length to extend slightly beyond the O-ring sealing element 55, and thus has its outer cylindrical surface constituting the sealing surface of the member 56. A uniform diameter central bore 70 for conducting fluid and for communication with the passage 52 extends through the centering portion 69 into the body 60. This bore 70 is in communication with a suitable small diameter, short metal tube 71 disposed perpendicular to the axis of the bore 70 and extending into the body 60 from one (rear) end thereof and secured thereto as by brazing. The metal tube 71 is spaced from the planar bottom flange 63 and disposed substantially parallel to the plane thereof as shown especially in FIG. 11, for convenient attachment to a rubber hose (not shown). When the interlocked joint 17 has internal fluid pressure in the passage 52, bore 70 and tube 71, the bottom flange 63 is maintained in contact with the segmental projections 59 by virtue of such pressure acting axially outward on the body 60 in coaction with the functioning of the elastically deformed O-ring sealing element.

The disconnectable joint 17 has retractable latch means including a resilient portion 78 mounted on the member 56 for preventing relative rotation of the members 47 and 56 in their interlocked condition shown in FIGS. 9 and 11. The latch means comprises a latch or lock element 72 of stainless steel having the form of a housing partially enclosing the body 60. The housing 72 has an integral front end portion 73 the lower part of which constitutes a tab portion, the front end portion 73 merging in inclined relation with an integral upper portion 74, both of which portions 73 and 74 are united with substantially parallel, spaced side portions 75, 76, whereby the housing or latch is open at its rear end opposite the front end portion 73. The latch or lock element 72 is pivotally mounted on the body 60 in adjacent spaced relation thereto by means of a known spring pin 77 extending laterally through the lower rear region of the body between the bottom flange 63 and the metal tube 71 and through the side portions 75, 76 of the housing or latch. The construction permits retracting the latch means by swinging the housing 72 pivotally about the spring pin 77 from the position of engagement with the segmental projection 59, as shown in full lines in FIG. 11, to the retracted position free of engagement with the segmental projection 59, as shown in broken lines in FIG. 11.

The latch means has its resilient portion in the form of a metal coil compression spring 78 disposed within a cylindrical opening in the upper front end region of the body 60, the spring continuously maintaining a rounded head contact element 79 resiliently pressed against the front end portion 73 at a position spaced above the pivotal axis of the latch. This construction resiliently urges the inclined front portion of the retractable latch 72 into the clearance space between the front end of the body 60 and the adjacent straight inner edge of a segmental projection 59 to retain the hollow member 56 in interlocked relation to the member 47, when the hollow member 56 is juxtaposed on the member 47 as shown in FIG. 10 and then rotated to the position shown in FIGS. 9 and 11. The latch 72 is conveniently retracted by the operator applying sufficient pressure against either the front end portion 73 on the upper portion 74 in a manner to compel further compression of the coil spring 78, thereby permitting the latch to pivot about the pin 77 to the position shown in broken lines in FIG. 11. Then the hollow member 56 can be rotated 90° from the position shown in FIG. 9 to the position shown in FIG. 10 and disconnected from the member 47.

In the operation of the disconnectable joint 17, the hollow member 56 is superimposed on the member 47 by inserting the bottom flange 63 through the opening defined by the circumferentially spaced, opposed segmental projections 59 of the member 47 to a position closely adjacent the seating surface 57. This juxtapositioning of the members is facilitated by the tubular centering portion 69 which is inserted axially into the central passage 52 in sliding fit with the wall 53 thereof and into sealing contact with the O-ring sealing element 55. When this has been accomplished, the latch 72 is initially retracted by the operator and the hollow member 56 is rotated until the flange portions 66, 67 including inclined camming surfaces 64a, 65a enter the channel and the latch 72 contacts the planar outer camming surface 59b of a segmental projection 59. Then the operator releases the force against the latch and continues the rotation until the spring 78 action compels the latch to pivot downwardly toward the flange portion 66 and engage the straight inner edge of the segmental projection 59 at which time the rounded edge flange portions 66, 67, segmental projections 59 and seating surface 57 are interlocked, as shown in FIGS. 9 and 11, thereby retaining the members 47 and 56 in interlocked relationship. The functioning of the coil spring 78 and rounded head contact element 79 assures maintaining the latch 72 in its engaged relationship to the segmental projection 59 until the latch is again retracted. The interlocked members 47 and 56 can be quickly disconnected by retracting the latch 72 against the yieldable resistance of the coil spring 78 and rotating the member 56 from its position shown in FIG. 9 to its position shown in FIG. 10. Then the hollow member 56 is wholly removed from the member 47 thus breaking the seal.

The second modification 18 of the disconnectable joint shown in FIGS. 12 and 13 has one member 80 and its associated inner ring 81 constructed and arranged like the member 19 and the inner ring 23 of the joint 15 to permit detachable engagement, when desired, with another member such as the nozzle 20 of the joint 15. However, the other member 82 of the cooperating members of the joint 18 shown in the drawings, constitutes a detachable plug overlying and effectively closing the central passage 83 for conducting fluid. The passage 83 extends through the member 80 axially of the elastomeric O-ring sealing element 84 mounted within the annular recess in the transverse, planar internal seating surface 85 which is bounded by the annular sidewall 86 terminating in the four, spaced overhanging segmental projections or portions 87 having straight inner edges and planar outer and inner surfaces 87a, 87b.

The other member 82 or plug may be of suitable aluminum alloy and includes a transverse flat cover portion 88 desirably of lesser outside diameter than the member 80, which cover portion is adapted to overlie and overlap the segmental projections 87 and includes an integral annular guard portion 89 projecting perpendicularly away from the planar outer surface 90 and extending about the periphery of cover portion 88. The guard portion 89 may have its radially outer face knurled or otherwise roughened for hand gripping purposes. The said member 82 has an integral annular dependent wall portion 91 projecting perpendicularly away from the planar inner surface 92 of the cover portion 88, which annular dependent wall portion 91 has an outside diameter slightly less than the dimension between the straight inner edges of opposed segmental projections 87 of the said one member 80 to permit positioning the annular wall portion 91 within the polygonal opening defined by the segmental portions 87 in adjacent spaced relation to the straight inner edges of the latter portions 87, as shown especially in FIG. 13.

The annular dependent wall portion 91 terminates in a plurality of (preferably four) flat, circumferentially spaced, interconnected flange portions 93 of generally triangular configuration in plan (like the flange portions 41 of the member 20) extending radially outward and having an outer peripheral configuration corresponding to that of the opening defined by the segmental projections 87. The flange portions 93 have planar outer and inner surfaces 93a and 93b and are of sufficient uniform thickness to be received in the channel defined by the seating surface 85, annular sidewall 86 and segmental projections 87 of the member 80 with the outer and inner surfaces 93a and 93b in interlocking relation to the seating surface 85 and the inner surfaces 87b of the segmental projections 87. The outer surfaces 93a of the flange portions 93 have inclined marginal camming surfaces 93c, 93d like those of the flange portions 41 of the member 20 shown especially in FIGS. 6, 7 and 8. The inner surfaces 93b of the flange portions 93 as a whole provide a continuous sealing surface of the member 82 contacting the O-ring sealing element 84 in sealing relation, when the members 80, 82 are juxtaposed and rotated until they are interlocked, as shown in FIGS. 12 and 13. The sealing element 84 in its elastically deformed condition provides, like the sealing element 29, two substantial flattened sealing areas and then three such sealing areas and also resiliently urges the flange portions 93 into contact with the inner surfaces of the segmental projections 87.

The preferred construction includes retractable latch means 94 with a resilient portion or spring lock 95 mounted as by spaced rivets 96, 97 on the planar outer surface 90 of the cover portion 88 of the member 82. The spring lock 95 of suitable stainless steel is constructed like the spring lock 43 and has flexible integral spaced side arm portions 98, 99 connected to a pair of transversely spaced, dependent, integral substantially flat tab portions 100, 101 adapted to have a side thereof contact the straight inner edge of a segmental projection 87. These tab portions are in end-to-end alignment and normally extend downwardly through an elongated slot 102 in the cover portion 88 in adjacent spaced relation to the annular dependent wall portion 91 to a position slightly spaced from the adjacent flange portion 93, when the spring lock 95 is not retracted.

The latch means 94 includes actuating means 103 or lifting arm of suitable stainless steel having a U-shaped cross-sectional configuration with one leg of the U terminating in a short, inwardly extending planar lever portion 104. The lever portion is disposed between the flat cover portion 88 and the spring lock 95 with one (rear) leg of the U-shaped lifting arm extending upwardly through a suitable transverse slotted opening in the spring lock 95 and the other (front) leg extending downwardly to a position radially inward and below the level of the annular guard portion 89, as shown especially in FIG. 13. Thus, the free end of said other leg is protected by the guard portion 89 against accidentally catching on adjacent parts of the suit in a manner to cause retraction of the spring lock 95.

When the spring lock 95 is in its normal non-retracted position shown in FIG. 13, the lever portion 104 is yieldably held in full contact with the flat cover portion 88; but pivots about its junction with the rear leg of the U-shaped lifting arm 103, when rearward force is applied to the lifting arm 103 as by the finger of the operator. As a result of the pivoting, the spring lock 95 including its side portions 98, 99 is compelled to flex upwardly or outwardly relative to the cover portion 88 to the retracted position so that the tab portions 100, 101 are capable of clearing the segmental projections 87 and of contacting the outer (camming) surfaces 87a of adjacent segmental projections 87. When such rearward force is terminated, the spring lock 95 resiliently resumes its normal non-retracted position, unless one or both tab portions 100, 101 contact the outer camming surface of a segmental projection 87.

In the operation of the disconnectable joint 18, the plug member 82 is juxtaposed flanged portions 93 first through the polygonal opening defined by the segmental projections 87 with the latch means 94 retracted, whereby the tab portions 100, 101 of the spring lock 95 contact the outer camming surfaces 87a of adjacent segmental projections 87 of the member 80. Then the plug member 82 is rotated 45° so that the flange portions 93 enter the channel and contact and interlock with the segmental projections 87 in sealing relation to the O-ring sealing element 84, the planar inner surface 92 of the cover portion 88 being slightly spaced from the outer camming surfaces of the segmental projections, and the tab portions 100, 101 being in the space between the annular wall portion 91 and the straight inner edge of a segmental projection 87 as shown in FIGS. 12 and 13.

To disconnect the plug member 82 from the member 80, the retractable latch means 94 is retracted and the member 82 then rotated with the tab portions 100, 101 contacting the outer camming surfaces of the segmental projections 87 until the flange portions 93 reach the position where they are in alignment with the opening defined by the segmental projections. When this position is reached, the functioning of the O-ring sealing element and the spring lock 95 resiliently urge the plug member 82 away from the member 80. The plug member 82 can then be fully removed from the member 80 thereby opening the passage for conducting fluid through the member 80.

The hollow integral nozzle 105 including its retractable latch means 106 shown in FIGS. 14 and 15, is a modification of the nozzle 20 and retractable latch means 42 shown in FIGS. 1 to 8, inclusive, and is designed for use with the member 19 of the disconnectable joint 15 described hereinabove. The nozzle 105 is adapted to be juxtaposed and rotated relative to the member 19 (shown in broken lines in FIGS. 14 and 15) until the nozzle 105 and member 19 are in interlocked sealing relationship.

The nozzle 105 and latch means 106 assembly differs in several aspects from the nozzle 20 and latch means 42 assembly. The nozzle 105 has a flared intermediate portion 107 with a rounded upper wall portion instead of a flat, inclined upper wall portion for improved airflow characteristics. The intermediate portion 107 merges at its rear region with an integral tubular end portion (not shown) constructed and arranged like the tubular end portion 34 of the nozzle 20. The intermediate portion 107 merges at its front region with a mouth end portion comprising a circular wall portion 108 arranged substantially perpendicular to the longitudinal axis of the tubular rear end portion of the nozzle 105 and united with a planar end wall portion 109 of generally quadrangular configuration arranged substantially parallel to said longitudinal axis in spaced relation to the intermediate and end portions, as shown in FIG. 15.

The planar end wall portion 109, like the end wall portion 40, has a central square mouth opening 109a therethrough and a planar lower or outer surface 109b constituting a continuous sealing surface for contacting the elastic O-ring sealing element 29. The end wall portion 109 also has four planar flange portions 110 of generally triangular configuration in plan made like the flange portions 41, with planar upper surfaces 110d having downwardly inclined, flat marginal camming surfaces 110e, 110f along the straight side edges of the flange portions 110, as shown in FIG. 14.

The circular wall portion 108 has a radially outward extending latch mounting portion 111 disposed across the front end region of the nozzle 105 and integrally united with the adjacent underlying flange portion 110. The latch mounting portion 111 has a slot 112 therein in spaced relation to such flange portion 110 for receiving a latch or spring lock 113 of the latch means 106. The slotted mounting portion 111 has parallel straight sides tangential to the diametrically opposite outer sides of the circular wall portion 108 and extending outwardly therefrom to an arcuate or rounded outer edge which is concentric about the wall portion 108, as shown in FIG. 14, the radius of said outer edge being less than one-half the dimension between opposite straight side edges of the generally quadrangular end wall portion 109. This permits accommodating the latch mounting portion 111 within the opening defined by the straight radially inner edges of the segmental projections of the member 19, as shown in FIG. 15.

The latch or spring lock 113 of suitable stainless steel and of U-shaped configuration has an arcuate or rounded portion 113a (base of the U) positioned within the slot 112 and secured to the mounting portion 111 as by a suitable screw 114. The spring lock 113 has substantially parallel integral side arm portions 113b, 113c (legs of the U) extending rearwardly from rounded portion 113 adjacent diametrically opposite sides of the circular wall portion 108 to a position beyond and spaced from the rear region of the circular wall portion 108 and spaced from the lower wall of the intermediate portion 107. The side arm portions 113b, 113c normally extend in substantially parallel spaced relation to the planar upper surfaces 110d of the flange portions 110 and can flex resiliently relative to the mounting portion 111. The latch means 106 includes a dependent planar tab portion 115 extending laterally between the side arm portions 113b, 113c in rearwardly spaced relation to the circular wall portion 108 and extending below the side arm portions to a position closely spaced from the upper surface 110d of the adjacent flange portion 110.

For convenience of manufacture and assembly purposes, the dependent tab portion 115 is formed integral with an actuating element 116 of suitable stainless steel extending between the end portions of the side arm portions 113b, 113c in overlapping relation thereto and secured thereto as by rivets 117, whereby the tab portion 115 moves with the spring lock 113, when the latter is flexed to and from its retracted position. The actuating element 116 has rearwardly projecting portions 116a, 116b aligned with the side arm portions 113b, 113c and bent upwardly, for example at an angle of 15°, toward the lower wall of the intermediate portion 107 of the nozzle 105, as shown in FIG. 15. This facilitates positioning the finger of the operator beneath the nozzle and the projecting portions 116a and 116b so as to apply a lifting force to the latter, thereby simultaneously upwardly flexing the side arm portions 113b, 113c and lifting the dependent tab portion 115 from its normal non-retracted position to its retracted position.

In the retracted position, the tab portion 115 will not interfere with a segmental projection of the member 19, but will be resiliently urged into contact with the outer camming surface or surfaces of one or more segmental projections of the member 19 upon relative rotation of the latter and the nozzle 105. When the latch means 106 is retracted and the nozzle 105 rotated from its locking position shown in FIGS. 14 and 15, to a position where the flanged portions of the nozzle are free of contact with the segmental projections of the member 19, a resilient force exerted by the retracted tab portion 115 of the latch means against the segmental projections together with the outward force acting on the end wall portion 109 due to the elastic recovery of the deformed O-ring sealing element 29 positively moves the nozzle 105 outwardly of the opening in the member 19 and thus breaks the seal.

To connect the nozzle 105 in interlocking sealing relationship to the member 19, the nozzle is inserted mouth end portion first through the opening defined by the segmental projections of the member 19 and then rotated with the retracted tab portion 115 of the latch means 106 riding on the outer camming surfaces of the segmental projections. During such rotation the flange portions 110 enter the channel in member 19 whereby the sealing element 29 is elastically deformed and urges the planar flanged portions 110 outwardly into contact with the planar inner surfaces of the segmental projections of the member 19. The camming surfaces 110e, 110f of the flange portions facilitate the initial entry of the latter into said channel. After the nozzle 105 has been rotated 45°, for example, the tab portion 115 of the latch means 106 is parallel with but radially spaced inwardly from the straight inner edge of an adjacent segmental projection of the member 19 whereupon the flexed side arm portions 113b, 113c of the spring lock resiliently return the tab portion 115 from its retracted position to its normal non-retracted position with the tab portion 115 in interfering relationship with the said edge of the segmental projection. This prevents further rotation of the nozzle 105 and maintains the flange portions 110 in interlocked contacting relation to the segmental projections of the member 19, as shown in FIGS. 14 and 15. The nozzle can be disconnected from the member 19 by reversing this procedure, that is, retracting the spring lock and tab portion rotating the nozzle until the flange portions again are free to move outwardly of the opening in the member 19.

Variations may be made without departing from the scope of the invention as defined in the following claims.

I claim:

1. A coupling comprising a socket member having a non-circular opening therein and having a longitudinal axis defining a center of rotation, and a complementary co-axial socket-engaging member, said opening in said socket member having a portion of its peripheral edge shaped to engage a complementary shaped latch member, and said edge portion being offset from said longitudinal axis a preselected distance, said members releasably interfitting at an assembly position and being relatively rotatable to an interlocked sealed position, at least one of said members having a fluid-conducting passage therein, said socket-engaging member having a body and a lobe-like flange at one side of the body, said opening of said socket member conforming to the peripheral shape of said body and said flange to receive said body and flange at said assembly position and having an internal channel open to said peripheral edge of said socket opening into which channel said flange is received when said members are rotated into their interlocked position, and a latch fixedly mounted on said socket-engaging member for releasably locking said members at their interlocked position, (A) said latch having a retractable locking portion engageable with said socket member at said edge portion of said opening in said socket member, (B) said locking portion being disposed so that it registers with and engages said edge portion only when said coupling members are in said mutually interlocked position, and (C) said locking portion including certain regions which have a greater rotational radius about said center of rotation of said socket member than the minimum distance of said engaged edge portion to said center but substantially equal to said preselected distance whereby said locking portion operates when engaged with said edge portion to positively prevent relative rotation of the coupling members.

2. A coupling as defined in claim 1 and further characterized in that:

(A) said latch includes a spring for biasing said locking portion toward its edge-engaging locked position, and (B) means for retracting said locking portion from engagement with said edge portion against the bias of said spring, and (C) said locking portion, in said retracted position and when the coupling members are rotated away from said interlocked position, being biased by said spring against areas of said socket member remote from said opening whereby said spring urges the axial separation of said coupling members.

3. A coupling as defined in claim 1 characterized in that said flange has a planar surface on its side adjoining said body of the socket-engaging member which surface is engageable with an interior planar surface of said channel in said socket member, and a marginal camming surface along said flange planar surface for effecting the entry of said flange into said channel to bring said planar surfaces into engagement.

4. A coupling as defined in claim 1 and further characterized in that said edge portion and said locking portion engageable therewith are planar.

5. A coupling as defined in claim 1 and further characterized in that said locking portion of the latch, in its engaged position, fits between said edge portion of said socket opening and an opposing region of the body of said socket-engaging member whereby said locking portion is squeezed between said members to further resist relative rotation of the members.

6. A coupling as defined in claim 2 and further characterized in that said spring of said latch is a resilient plate of generally U-shaped configuration fastened to said socket-engaging member on the side thereof directed away from said socket member, and said locking portion is a flat plate integral with and near the extremities of the legs of said U-shaped plate, and a manually engageable member between the legs of said U-shaped plate operable to pry said legs resiliently away from said socket-engaging member to deflect said legs and thereby displace said locking portion.

References Cited in the file of this patent

UNITED STATES PATENTS

| | | |
|---|---|---|
| 875,004 | Shears | Dec. 31, 1907 |
| 1,213,492 | Hughes | Jan. 23, 1917 |
| 1,235,075 | Stamm | July 31, 1917 |
| 1,551,940 | Cooper et al. | Sept. 1, 1929 |
| 1,858,251 | Spicer | May 17, 1932 |
| 2,111,553 | Chew | Mar. 22, 1938 |
| 2,317,729 | Bruno | Apr. 27, 1943 |
| 3,011,803 | Buckner et al. | Dec. 5, 1961 |

FOREIGN PATENTS

| | | |
|---|---|---|
| 4,545 | Great Britain | Mar. 24, 1890 |
| 812,041 | Great Britain | Apr. 15, 1959 |